United States Patent
Jung et al.

(10) Patent No.: US 9,716,295 B2
(45) Date of Patent: Jul. 25, 2017

(54) IN-SITU COIN CELL FOR REAL TIME ANALYSIS, MEASURING SYSTEM INCLUDING THE SAME, METHOD OF MANUFACTURING IN-SITU COIN CELL AND METHOD OF MEASURING IN-SITU COIN CELL USING LIGHT

(71) Applicant: Samsung Electronics Co., Ltd., Suwon-si, Gyeonggi-do (KR)

(72) Inventors: Changhoon Jung, Seoul (KR); Euiseong Moon, Seoul (KR); Soohwan Sul, Suwon-si (KR); Jaeduck Jang, Suwon-si (KR); Heechul Jung, Gunpo-si (KR); Byungjin Choi, Seoul (KR)

(73) Assignee: SAMSUNG ELECTRONICS CO., LTD, Gyeonggi-Do (KR)

( * ) Notice: Subject to any disclaimer, the term of this patent is extended or adjusted under 35 U.S.C. 154(b) by 57 days.

(21) Appl. No.: 14/919,100

(22) Filed: Oct. 21, 2015

(65) Prior Publication Data

US 2016/0322677 A1    Nov. 3, 2016

(30) Foreign Application Priority Data

Apr. 30, 2015  (KR) .................. 10-2015-0062023

(51) Int. Cl.
*H01M 10/48* (2006.01)
*H01M 10/0525* (2010.01)
(Continued)

(52) U.S. Cl.
CPC ......... *H01M 10/48* (2013.01); *H01M 2/0222* (2013.01); *H01M 10/0427* (2013.01);
(Continued)

(58) Field of Classification Search
CPC .............. H01M 10/48; H01M 2/0222; H01M 10/0427; H01M 10/0525; H01M 2220/30
See application file for complete search history.

(56) References Cited

U.S. PATENT DOCUMENTS

| | | | |
|---|---|---|---|
| 5,635,138 A | 6/1997 | Amatucci et al. | |
| 7,022,290 B2 | 4/2006 | Gural et al. | |

(Continued)

FOREIGN PATENT DOCUMENTS

| KR | 1020080012438 A | 2/2008 |
|---|---|---|
| KR | 101274730 B1 | 6/2013 |

OTHER PUBLICATIONS

EL-CELL electrochemical test equipment, Electrochemical Test Cell ECC-Opto-Std, User Manual Release: 2.2 Jan. 22, 2014, pp. 1-13, 2011-2014 EL-CELL GmbH.

(Continued)

*Primary Examiner* — Stewart Fraser
(74) *Attorney, Agent, or Firm* — Cantor Colburn LLP

(57) ABSTRACT

An in-situ coin cell includes a case, a cap coupled to the case, and an energy storage member disposed between the case and the cap, where a through hole is defined in at least one of the case and the cap, the energy storage member includes a current collector adjacent to the through hole, and another through hole is defined in the current collector. The in-situ coin cell may further include a transparent window between the current collector and at least one of the through holes.

25 Claims, 13 Drawing Sheets

(51) Int. Cl.
    *H01M 10/04*    (2006.01)
    *H01M 2/02*     (2006.01)

(52) U.S. Cl.
    CPC .... *H01M 10/0525* (2013.01); *H01M 2220/30* (2013.01); *Y02T 10/7011* (2013.01)

(56) References Cited

U.S. PATENT DOCUMENTS

| | | | | |
|---|---|---|---|---|
| 2010/0047666 A1* | 2/2010 | Tatsumi | H01M 2/0222 | 429/403 |
| 2010/0304274 A1* | 12/2010 | Bennett | H01M 4/8605 | 429/499 |
| 2011/0027666 A1* | 2/2011 | Burchardt | B60L 11/1879 | 429/406 |
| 2011/0039165 A1* | 2/2011 | Sugiyama | C12Q 1/006 | 429/401 |
| 2011/0091753 A1* | 4/2011 | Wang | H01M 2/0222 | 429/94 |
| 2011/0236772 A1* | 9/2011 | Burchardt | H01M 4/8605 | 429/403 |
| 2012/0208102 A1* | 8/2012 | Schumm, Jr. | H01M 8/04089 | 429/444 |
| 2014/0114519 A1* | 4/2014 | Iwama | H01M 4/485 | 701/22 |
| 2014/0270080 A1 | 9/2014 | El-Dasher et al. | | |
| 2014/0346052 A1 | 11/2014 | Ozaki et al. | | |
| 2016/0036011 A1* | 2/2016 | Jung | H01M 10/48 | 429/174 |
| 2016/0054593 A1* | 2/2016 | Flitsch | G02C 11/10 | 351/158 |

OTHER PUBLICATIONS

Wu, et al., In situ Raman spectroscopy of LiFePO4: size and morphology dependence during charge and self-discharge, IOP Publishing Ltd, Nanotechnology 24 (2013) 424009 (9 pages).

* cited by examiner

IN-SITU COIN CELL FOR REAL TIME ANALYSIS, MEASURING SYSTEM INCLUDING THE SAME, METHOD OF MANUFACTURING IN-SITU COIN CELL AND METHOD OF MEASURING IN-SITU COIN CELL USING LIGHT

CROSS-REFERENCE TO RELATED APPLICATION

This application claims priority to Korean Patent Application No. 10-2015-0062023, filed on Apr. 30, 2015, and all the benefits accruing therefrom under 35 U.S.C. §119, the content of which in its entirety is herein incorporated by reference.

BACKGROUND

1. Field

The disclosure relates to an in-situ coin cell for analyzing a state change of an electrode material according to charge and discharge of a secondary battery, and more particularly, to an in-situ coin cell for real time analysis of the state of an electrode, a measuring system including the in-situ coin cell, a method of manufacturing an in-situ coin cell, and a method of measuring the state change of an electrode of an in-situ coin cell using light.

2. Description of the Related Art

Due to its high energy density and ease of design, lithium ion batteries ("LIB"s) have been widely used as main power supply sources of mobile electronic devices. Also, the use of LIBs has been expanded to electric automobiles or power storage devices for renewable energy. In order to meet market requirements, studies have been actively performed for developing an LIB material having high energy density and a long lifespan.

Graphite material and lithium cobalt oxide have been commercialized as a cathode material and an anode material. In LIB, an alloy group carbon composite material may be used as a cathode material, and an over-lithiated oxide ("OLO") may be used as an anode material. The alloy group carbon composite material and the OLO material have a higher capacity and higher energy density when compared to the graphite material and the lithium cobalt oxide.

SUMMARY

In a lithium ion battery, where an over-lithiated oxide ("OLO") material is used an anode material thereof, due to uncertainty of structural safety resulting from continuous attachment and detachment of lithium during charge and discharge, OLO may not be effectively used as the anode material. Accordingly, for commercialization of such material as the electrode materials, real time observation of the state change of electrode materials during charge and discharge and the investigation of degradation of the electrode materials may be needed.

Embodiments of the invention relate to an in-situ coin cell for real time analysis, which provides an analyzing result with high reliability and applicability to an actually using secondary battery.

Embodiments of the invention relate to a measuring system including the in-situ coin cell.

Embodiments of the invention relate to a method of manufacturing the in-situ coin cell.

Embodiments of the invention relate to a method of measuring the state change of an electrode of an in-situ coin cell using light.

According to an exemplary embodiment of the invention, an in-situ coin cell includes: a case; a cap coupled to the case; and an energy storage member disposed between the case and the cap, where a through hole is defined in at least one of the case and the cap, the energy storage member includes a current collector adjacent to the through hole, and another through hole is defined in the current collector.

In an exemplary embodiment, the in-situ coin cell may further include a transparent window between the current collector and at least one of the through hole and the another through hole.

In an exemplary embodiment, the energy storage member may include: a first current collector; a first electrode structure in contact with the first current collector; a second electrode structure facing the first electrode structure; a separator disposed between the first and second electrode structures; and an electrolyte, where a first through hole is defined in the first current collector, and a portion of the first electrode structure is exposed through the first through hole.

In an exemplary embodiment, the energy storage member may further include a second current collector in contact with the second electrode structure, where a second through hole is defined in the second current collector, and a portion of the second electrode structure is exposed through the second through hole.

In an exemplary embodiment, one of the first and second electrode structures may be a cathode, and the other of the first and second electrode structures may be an anode In an exemplary embodiment, the in-situ coin cell may further include an elastic body between the energy storage member and one of the case and the cap.

According to another exemplary embodiment of the invention, a measuring system includes: the in-situ coin cell described above; and a first optical measuring system which irradiates the in-situ coin cell with light and measures light emitted from the in-situ coin cell due to the irradiation.

In an exemplary embodiment, the first optical measuring system may include: a light source; a light path conversion element which transmits light received from the light source to the in-situ coin cell and passes light received from the in-situ coin cell; a lens system which focuses light received from the light path conversion element onto the in-situ coin cell and transmits light received from the in-situ coin cell to the light path conversion element; and a measuring device which measures pieces of optical information, which are generated by the in-situ coin cell and different from each other.

In an exemplary embodiment, the light source may include a light source which emits coherent light or non-coherent light.

In an exemplary embodiment, the measuring device may include a plurality of measuring devices, and the plurality of measuring devices may measure the pieces of optical information, which are generated by the in-situ coin cell and different from each other.

In an exemplary embodiment, the light source may include a plurality of light sources, and the plurality of light sources may emit coherent lights having different wavelengths from each other.

In an exemplary embodiment, the plurality of measuring devices may include an optical image measuring camera, a Raman shift measuring spectrometer, and a photoluminescence ("PL") measuring spectrometer.

In an exemplary embodiment, the measuring system may further include a second optical measuring system opposite to the first optical measuring system with the in-situ coin cell therebetween.

According to another exemplary embodiment, a method of manufacturing an in-situ coin cell, the method includes: preparing a case; providing an energy storage member on a horizontal portion of the case where the energy storage member includes a current collector in which a through hole is defined; and providing a cap which covers the energy storage member and is coupled to the case; and forming a through hole in at least one of the case and the cap.

In an exemplary embodiment, the through hole may be formed in the horizontal portion of the case.

In an exemplary embodiment, the through hole may be formed in the cap.

In an exemplary embodiment, the forming the through hole in at least one of the case and the cap may include forming the through hole both in the horizontal portion of the case and the cap.

In an exemplary embodiment, the providing the energy storage member may include disposing a first current collector, in which the through hole is defined, and a first electrode structure to contact the first current collector, disposing a second electrode structure opposite to the first electrode structure, disposing a separator between the first electrode structure and the second electrode structure; and supplying an electrolyte to the first electrode structure.

In an exemplary embodiment, the providing the energy storage member may further include disposing a second current collector, in which the through hole is defined, on the second electrode structure.

In an exemplary embodiment, the method may further include disposing a transparent window between the case and the current collector, where the through is formed in the case, and the case is adjacent to the current collector.

In an exemplary embodiment, the method may further include disposing a transparent window between the cap and the current collector, where the through is formed in the cap, and the cap is adjacent to the current collector.

In an exemplary embodiment, the method may further include disposing an elastic body between one of the cap and the case, in which the through hole is not formed, and the energy storage member.

According to another exemplary embodiment, a method of measuring the state change of an electrode of the in-situ coin cell described above, the method includes starting an operation of charging and discharging the in-situ coin cell, irradiating the in-situ coin cell with light and measuring light from the in-situ coin cell as a result of the irradiating.

BRIEF DESCRIPTION OF THE DRAWINGS

These and/or other features of the invention will become apparent and more readily appreciated from the following description of the exemplary embodiments, taken in conjunction with the accompanying drawings, in which.

DETAILED DESCRIPTION

Figure 1:
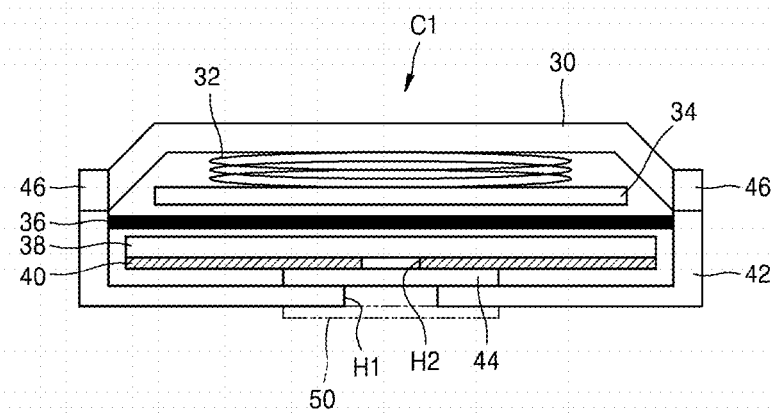
FIGS. 1 through 3 are cross-sectional views of an in-situ coin cell for real time analysis, according to an exemplary embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. In the drawings, thicknesses of layers and regions may be exaggerated for clarity of layers and regions.

Exemplary embodiment of an in-situ coin cell for real time analysis, a measuring system including the in-situ coin cell, a method of manufacturing the in-situ coin cell for real time analysis, and a method of measuring the state change of an electrode of the in-situ coin cell for real time analysis will now be described in detail with reference to the accompanying drawings.

Figure 2:
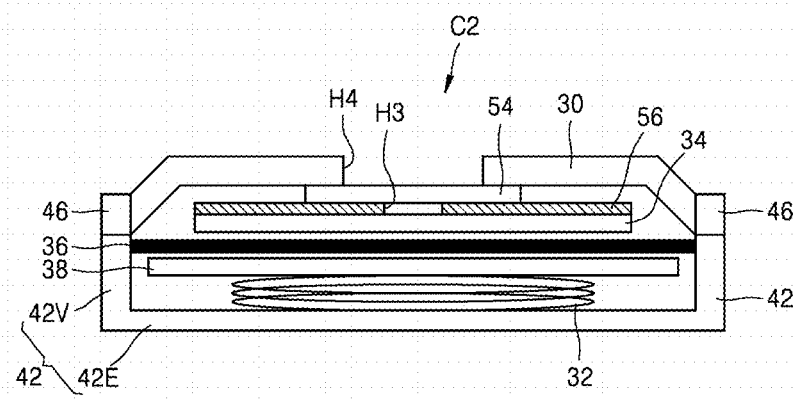
Figure 3:
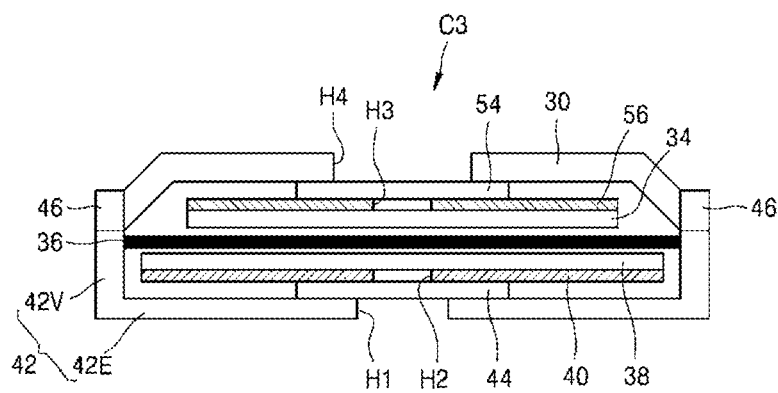

Hereinafter, an exemplary embodiment of an in-situ coin cell for real time analysis will be described. FIGS. 1 through 3 are cross-sectional views of an in-situ coin cell for real time analysis, according to an exemplary embodiment.

Referring to FIG. 1, an exemplary embodiment of an in-situ coin cell C1 includes a case 42. A first through hole H1 is defined or formed in the case 42. Light for analysis may be irradiated through the first through hole H1. In an exemplary embodiment, the first through hole H1 may have a diameter of about 5 millimeters (mm) or less, for example, in a range from about 1 mm to about 2 mm. Alternatively, the diameter of the first through hole H1 may be greater than about 5 mm when it is desired for irradiating light. The case 42 includes a horizontal portion and a vertical portion. The first through hole H1 may be defined through the horizontal portion of the case 42. In an exemplary embodiment, a transparent protection cover 50 that covers the first through hole H1 may be disposed on a lower surface of the case 42. Alternatively, the transparent protection cover 50 may be omitted. The transparent protection cover 50 may be a film including or formed of a transparent material with respect to the incident light. A first transparent window 44 is disposed on the horizontal portion of the case 42. The first transparent window 44 may be, for example, a transparent glass pane. The first transparent window 44 covers the first through hole H1. The first transparent window 44 may directly contact the case 42. The first transparent window 44 may be attached to the case 42 by an adhesive. The first transparent window 44 and the case 42 may be adhered to each other. The first transparent window 44 and the case 42 may be sealed. Accordingly, in such an embodiment, a liquid material, for example, an electrolyte that presents in the in-situ coin cell C1 may be effectively prevented from leaking between the case 42 and the first transparent window 44. A first metal foil 40 is disposed on the horizontal portion of the case 42. The first metal foil 40 may cover an entire portion (e.g., an upper or inner surface) of the first transparent window 44. The first metal foil 40 may directly contact the first transparent window 44. The first metal foil 40 may be a current collector of a first electrode structure 38 disposed thereon. The first metal foil 40 may be, for example, an aluminum foil or a copper foil. A second through hole H2 is defined or formed in the first metal foil 40. The second through hole H2 may be located directly above the first through hole H1. The second through hole H2 may be located within the first through hole H1 when viewed from a bottom plan view. The second through hole H2 has a diameter smaller than that of the first through hole H1. The second through hole H2 may have a diameter of, for example, 1 mm or less. However, the diameter of the second through hole H2 may be variously modified, e.g., increased or decreased, according to light irradiation conditions and environment. The first electrode structure 38 is disposed on the first metal thin film 40. The first electrode structure 38 may be a cathode or an anode. A material of the first metal foil 40 may vary according to the kind of the first electrode structure 38. In one exemplary embodiment, For example, when the first electrode structure 38 is a cathode, the first metal foil 40 which is a current collector may be an aluminum foil. Alternatively, when the first electrode structure 38 is an anode, the first metal foil 40 may be a copper foil. The first electrode structure 38 covers the second through hole H2 and the entire upper surface of the first metal foil 40. The first electrode structure 38 may directly contact the first metal foil 40. The first electrode structure 38 may include an active material that includes lithium (Li), for example, $LiCoO_2$. The first electrode structure 38 may include an electrolyte. A separator 36 is disposed on the first electrode structure 38. The separator 36 effectively prevents a contact between the first electrode structure 38 and a second electrode structure 34. The separator 36 contacts inner surfaces of the vertical portion of the case 42. A cap 30 is disposed above the separator 36. The case 42 may be referred to as a lower case, and the cap 30 may be referred to as an upper case. The cap 30 includes a horizontal portion and an inclined portion. The cap 30 covers the separator 36. A gasket 46 is disposed to seal the cap 30 and the case 42. In one exemplary embodiment, the gasket 46 may be, for example, an O-ring. Alternatively, another type of sealing member may be used as the gasket 46 besides the O-ring. The second electrode structure 34 may be between the cap 30 and the separator 36. The second electrode structure 34 may contact the separator 36. The second electrode structure 34 may be a cathode or an anode. When the first electrode structure 38 is a cathode, the second electrode structure 34 may be an anode. When the first electrode structure 38 is an anode, the second electrode structure 34 may be a cathode. The second electrode structure 34 may be, for example, a lithium layer. In an exemplary embodiment, the second electrode structure 34 may include a first layer and a second layer (not shown), which are sequentially stacked one on another. In such an embodiment, the first layer and the second layer may contact each other. The first layer may directly contact the separator 36. In an exemplary embodiment, the first layer may be defined by a material layer coated with an active material. In such an embodiment, the material layer may be, for example, a graphite layer, a silicon layer, or a silicon-carbon composite layer. The second layer may be a current collector, and the current collector may be a conductive film including an aluminum foil and a copper thin film deposited on the aluminum foil.

An elastic body 32 may be disposed between the second electrode structure 34 and the cap 30. By the elastic body 32, a pressure may be maintained in the in-situ coin cell C1. The elastic body 32 may be, for example, a spring. The first electrode structure 38, the separator 36, the first metal foil 40, the electrolyte and the second electrode structure 34 may collectively define an energy storage member that stores electrical energy by charging.

FIG. 2 is an in-situ coin cell C2 according to another exemplary embodiment. Elements of the in-situ coin cell C2 that are different from the elements of the in-situ coin cell C1 will hereinafter be described in detail. FIG. 2 shows an exemplary embodiment, where a fourth through hole H4 is defined or formed in the cap 30.

Referring to FIG. 2, the case 42 includes a horizontal portion 42E and a vertical portion 42V. A hole is not defined or formed in the horizontal portion 42E of the case 42. The fourth through hole H4 is defined or formed in a horizontal portion of the cap 30. In such an embodiment, the fourth through hole H4 may correspond to the first through hole H1 described above with reference to FIG. 1. The fourth through hole H4 may have a diameter of about 5 mm or less, for example, in a range from about 1 mm to about 2 mm. Light to be irradiated onto the second electrode structure 34 enters through the fourth through hole H4. The second electrode structure 34 may be an anode. A second metal foil 56 and a second transparent window 54 are sequentially stacked between the cap 30 and the second electrode structure 34. The second metal foil 56 is disposed on the second electrode structure 34. The second metal foil 56 is a current collector, and may be directly contact the second electrode structure 34. The second metal foil 56 may correspond to the second layer described above with reference to FIG. 1. A third through hole H3 is defined or formed in the second metal foil 56. The third through hole H3 may be located below the fourth through hole H4 of the cap 30. The third through hole H3 may have a diameter smaller than that of the fourth through hole H4. The third through hole H3 may be positioned within the fourth through hole H4 when viewed from a top plan view. Light for analysis is incident to the second electrode structure 34 sequentially passing through the fourth through hole H4, the second transparent window 54, and the third through hole H3. The second transparent window 54 is disposed between the cap 30 and the second metal foil 56. The second transparent window 54 may contact both the cap 30 and the second metal foil 56. The second transparent window 54 is disposed between the fourth through hole H4 and the third through hole H3. The second transparent window 54 covers the fourth through hole H4 on an upper side and covers the third through hole H3 on a lower side. The second transparent window 54 may include substantially the same material of the first transparent window 44 shown in FIG. 1. The separator 36 contacts an inner surface of the vertical portion 42V of the case 42. The elastic body 32 may be disposed between the horizontal portion 42E of the case 42 and the first electrode structure 38. The elastic body 32 may perform the same function as that described with reference to FIG. 1.

FIG. 3 is an in-situ coin cell C3 according to another exemplary embodiment. Elements of the in-situ coin cell C3 that are different from the elements of the in-situ coin cells C1 and C2 depicted in FIGS. 1 and 2 will hereinafter be described in detail. FIG. 3 shows an exemplary embodiment where holes are defined or formed in both the horizontal portion 42E of the case 42 and the horizontal portion of the cap 30.

Referring to FIG. 3, the first through hole H1 is defined or formed in the horizontal portion 42E of the case 42. The fourth through hole H4 is defined or formed in the horizontal portion of the cap 30. The in-situ coin cell C3 of FIG. 3 may correspond to an exemplary embodiment, in which the in-situ coin cell C1 of FIG. 1 and the in-situ coin cell C2 of FIG. 2 are combined. In such an embodiment, the first through hole H1 defined or formed in the case 42 and the fourth through hole H4 defined or formed in the cap 30 are aligned in a vertical direction. The first transparent window 44 may be between the horizontal portion 42E of the case 42 and the first metal foil 40, and the second transparent window 54 may be between the second metal foil 56 and the cap 30. The first and second transparent windows 44 and 54 may be substantially the same as those described above with reference to FIGS. 1 and 2, respectively.

In the in-situ coin cell C3 of FIG. 3, both the case 42 and the cap 30 may have through holes for light irradiating, for example, the first and fourth through holes H1 and H4. Therefore, the state change of electrode material(s) of the first electrode structure 38 and/or the second electrode structure 34 according to charge and discharge may be measured by light irradiating through the first through hole H1 of the case 42 and/or the fourth through hole H4 of the cap 30. By analyzing the measured data, the state change of the first electrode structure 38 and/or the second electrode structure 34 according to charge and discharge may be observed in real time.

Although not shown in FIG. 3, a first elastic body may be disposed between the horizontal portion 42E of the case 42 and the first transparent window 44, but not being limited thereto. In an alternative exemplary embodiment, the first elastic body may be omitted. In an exemplary embodiment, where the first elastic body is disposed between the horizontal portion 42E of the case 42 and the first transparent window 44, the first elastic body may be substantially the same as the elastic body 32 described with reference to FIG. 1. In such an embodiment, where the first elastic body is disposed, the first transparent window 44 in the state depicted in FIG. 3 may be further expanded in the lateral direction to cover most of the horizontal portion 42E of the case 42 or cover the whole horizontal portion 42E of the case 42. The first elastic body may be disposed not to interrupt the light irradiation. In one exemplary embodiment, for example, the first elastic body may be disposed to surround the first through hole H1 between the first transparent window 44 and the horizontal portion 42E of the case 42.

Alternatively, a second elastic body (not shown) instead of the first elastic body may be disposed between the cap 30 and the second transparent window 54, but not being limited thereto. In another alternative exemplary embodiment, the second elastic body may be omitted. In an exemplary embodiment, where the second elastic body is disposed between the cap 30 and the second transparent window 54, the second transparent window 54 in the state as depicted in FIG. 3 may be further expanded in the lateral direction to cover most of bottom surface of the horizontal portion of the cap 30 or cover the whole bottom surface of the horizontal portion of the cap 30. In such an embodiment, the second elastic body may be disposed to surround the fourth through hole H4 between the second transparent window 54 and the horizontal portion of the cap 30. In an exemplary embodiment, where the second elastic body is disposed as described above, the second elastic body is disposed not to interrupt the light irradiation.

Now, exemplary embodiments of an analysis system including an in-situ coin cell will be described.

Figure 4:
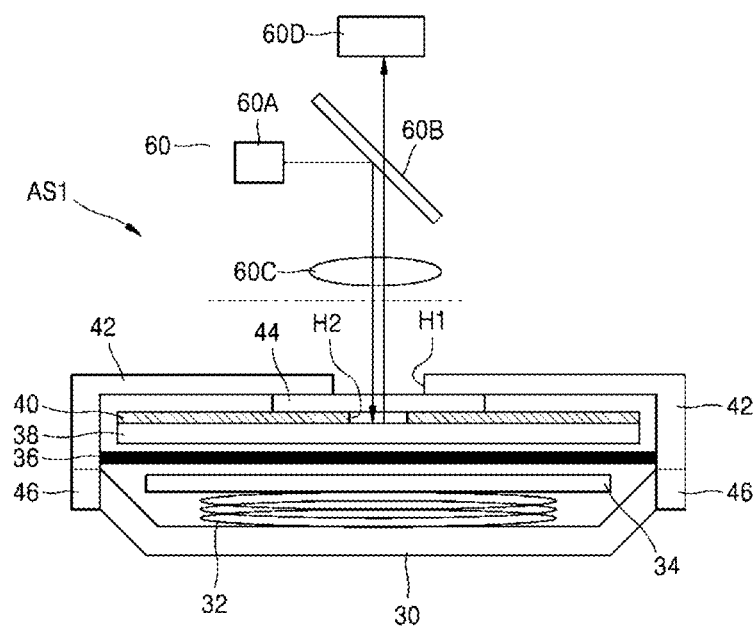
FIG. 4 is a cross-sectional view of a first measuring system having an in-situ coin cell for real time analysis, according to an exemplary embodiment.

FIG. 4 is a cross-sectional view of a first measuring system AS1 including the in-situ coin cell C1 for real time analysis, according to an exemplary embodiment.

Referring to FIG. 4, an exemplary embodiment of the first measuring system AS1 includes the in-situ coin cell C1 of FIG. 1 and an optical measuring system 60. The optical measuring system 60 includes a light source 60A, a beam splitter 60B, a lens system 60C, and a measuring unit (device) 60D. The light source 60A may include a light source that emits coherent light or non-coherent light. The coherent light may be, for example, a laser. The non-coherent light may be, for example, a white light. The beam splitter 60B may be disposed on a location or in a way such that the beam splitter 60B reflects light from the light source 60A towards the lens system 60C and transmits light from through the lens system 60C to the measuring unit (device) 60D. Light incident to the beam splitter 60B through the lens system 60C may be light that is emitted from the in-situ coin cell C1 after being irradiated to the in-situ coin cell C1. Light incident to the beam splitter 60B through the lens system 60C enters to the measuring unit (device) 60D after passing through the beam splitter 60B. For convenience of illustration, the lens system 60C is shown as a single lens, but not being limited thereto. In an exemplary embodiment, the lens system 60C may be a lens optical system that includes a plurality of lenses. The lens system 60C may be located directly above the first through hole H1 of the in-situ coin cell C1. An optical axis of the lens system 60C may pass through a center of the second through hole H2 in the first metal foil 40. The lens system 60C may be disposed in a way such that light incident to the in-situ coin cell C1 through the lens system 60C is focused on the first electrode structure 38. In one exemplary embodiment, For example, the lens system 60C may be disposed in a predetermined position to allow the light incident to the in-situ coin cell C1 through the lens system 60C to be focused on a surface of the first electrode structure 38. The lens system 60C, the beam splitter 60B, and the measuring unit (device) 60D may be disposed on the same optical axis. The beam splitter 60B may be disposed between the lens system 60C and the measuring unit (device) 60D. Alternatively, another optical path conversion element may be used instead of the beam splitter 60B, which is an element of various optical path conversion elements. The lens system 60C, the beam splitter 60B, and the measuring unit (device) 60D may be linearly disposed along a same direction, e.g., a vertical direction. The light source 60A may be horizontally disposed in a direction substantially perpendicular to the vertical direction. The measuring unit (device) 60D may be an optical device that receives light emitted from the in-situ coin cell C1 after the light is irradiated to the in-situ coin cell C1. The measuring unit (device) 60D may include, for example, a camera and/or a spectrometer. The camera may be, for example, a charge coupled device ("CCD") camera. Emitted light, scattered light, or reflected light from the first electrode structure 38 of the in-situ coin cell C1 may be measured by the measuring unit (device) 60D.

The scattered light may be light that is scattered by an active material of the first electrode structure 38. A portion of the light irradiated to the first electrode structure 38 may be absorbed by the active material, and a portion of the absorbed light is emitted according to photoluminescence ("PL") phenomenon. The light emitted from the first electrode structure 38 may be denoted as the light emitted from the first electrode structure 38 according to the PL phenomenon.

Data with respect to the state change of the first electrode structure 38 according to charge and discharge may be obtained by measuring and analyzing various light emitted from the first electrode structure 38 after irradiating the in-situ coin cell C1 while charge and discharge are performed.

In such an embodiment of the first measuring system AS1 depicted in FIG. 4, the in-situ coin cell C2 shown in FIG. 2 may be included instead of the in-situ coin cell C1. Accordingly, data with respect to the state change of the second electrode structure 34 according to charge and discharge may be obtained.

Figure 5:
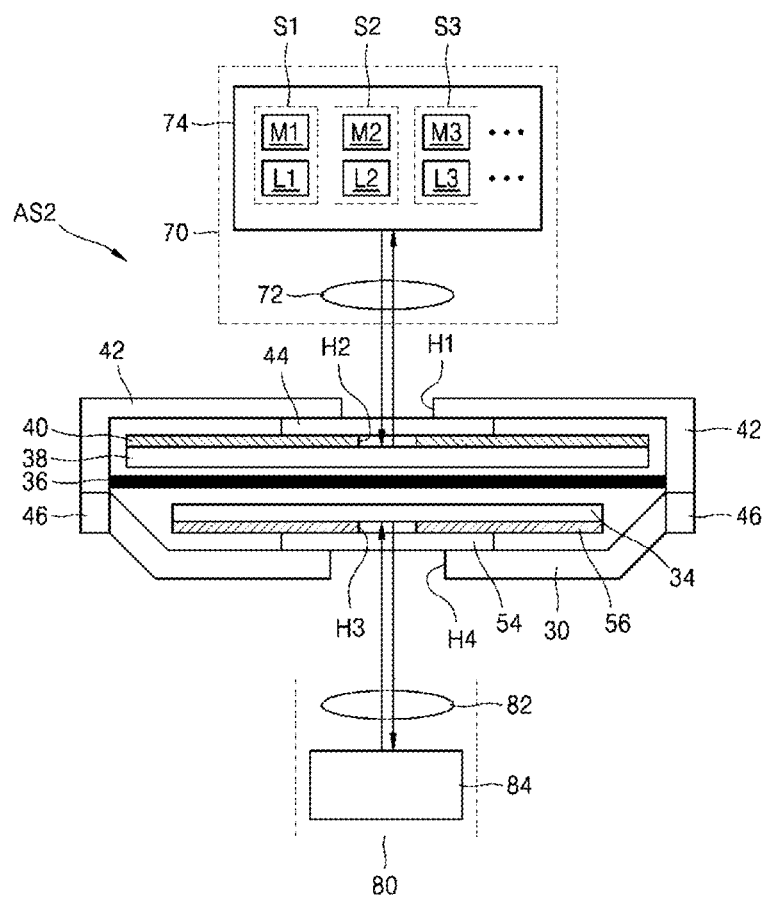
FIG. 5 is a cross-sectional view of a second measuring system having an in-situ coin cell for real time analysis, according to another exemplary embodiment.

FIG. 5 is a cross-sectional view of a second measuring system AS2 including the in-situ coin cell C3 for real time analysis, according to another exemplary embodiment.

Referring to FIG. 5, an exemplary embodiment of the second measuring system AS2 includes the in-situ coin cell C3 of FIG. 3, a first optical measuring system 70, and a second optical measuring system 80. The first optical measuring system 70 may be disposed to perform light irradiation to the first electrode structure 38, and to measure light emitted, scattered or reflected from the first electrode structure 38. The second optical measuring system 80 may be disposed to perform light irradiation to the second electrode structure 34, and to measure light emitted, scattered, or reflected from the second electrode structure 34. One of the first optical measuring system 70 and the second optical measuring system 80 may be disposed on the in-situ coin cell C3 and the other of the first optical measuring system 70 and the second optical measuring system 80 may be disposed under the in-situ coin cell C3. The in-situ coin cell C3 is between the first optical measuring system 70 and the second optical measuring system 80. The first optical measuring system 70 may include a first optical measuring part (or device) 74 and a lens system 72. The lens system 72 may include a single lens or a plurality of lenses. The single lens may be a convex lens. The plurality of lenses may include convex lenses or a combination of convex lenses and concave lenses. The lens system 72 may be disposed directly above the first through hole H1. The lens system 72 may be disposed in a way such that an optical axis of the lens system 72 passes through the center of the second through hole H2 defined or formed in the first metal foil 40. The first optical measuring part 74 and the lens system 72 may be disposed on the same optical axis. The first optical measuring part 74 may include a first optical measuring unit S1, a second optical measuring unit S2, and a third first optical measuring unit S3. The first optical measuring unit S1 may include a first light source L1 and a first measuring device M1. The second optical measuring unit S2 may include a second light source L2 and a second measuring device M2. The third optical measuring unit S3 may include a third light source L3 and a third measuring device M3. Some of the first through third light sources L1, L2 and L3 may be light sources that emit non-coherent light, and the remaining of the first through third light sources L1, L2 and L3 may be light sources that emit coherent light. In one exemplary embodiment, for example, the first light source L1 may be a light source (for example, white light emission source) that emits non-coherent light, and the second and third light sources L2 and L3 may be light sources (for example, a laser) that emit coherent light. Lights emitted from the light sources that emit coherent light may have different wavelengths. In one exemplary embodiment, for example, the second light source L2 may emit a laser beam having a first wavelength, and the third light source L3 may emit a laser beam having a second wavelength different from the first wavelength. Some of the first through third measuring devices M1, M2 and M3 may be optical image measuring devices and the remaining of the first through third measuring devices M1, M2 and M3 may be spectrometers. In one exemplary embodiment, for example, the first measuring device M1 may be a camera (for example, a CCD camera) for measuring an optical image of the first electrode structure 38 according to charge and discharge by receiving light reflected from the first electrode structure 38 after the light emitted from the first light source L1 is irradiated to the first electrode structure 38 during charging and discharging. The second and third measuring devices M2 and M3 may be spectrometers for measuring an Raman shift and a PL characteristic with respect to the first electrode structure 38 by measuring light emitted from the first electrode structure 38 after the light is irradiated to the first electrode structure 38 during charging and discharging. The first through third measuring devices M1, M2 and M3 may include the beam splitter 60B of FIG. 4 together with the camera or the spectrometer. In such an embodiment, the relationship of disposition of the constituent elements included in the measuring device may be substantially the same as that described above with reference to FIG. 4.

In such an embodiment, the optical image measurement, the Raman shift, and the PL characteristic may be separately measured, simultaneously measured, or sequentially measured with time intervals. In such an embodiment, various measuring methods may be implemented.

The second optical measuring system 80 may include a lens system 82 and a second optical measuring part (or device) 84. The lens system 82 may have a configuration the same as or similar to that of the lens system 72 of the first optical measuring system 70. The lens system 82 may be located below the fourth through hole H4. The lens system 82 may be disposed in a way such that light irradiated through the lens system 82 is focused on the second electrode structure 34. Light irradiated through the lens system 82 may be focused on a lower surface of the second electrode structure 34. The lens system 82 may be disposed in a way such that an optical axis of the lens system 82 passes through the center of the third through hole H3 of the second metal foil 56. The configuration of the second optical measuring part 84 may be the same as or similar to the first optical measuring part 74 of the first optical measuring system 70. Accordingly, in FIG. 5, the second optical measuring part 84 is depicted as a simple single block for convenience of illustration.

Figure 6:
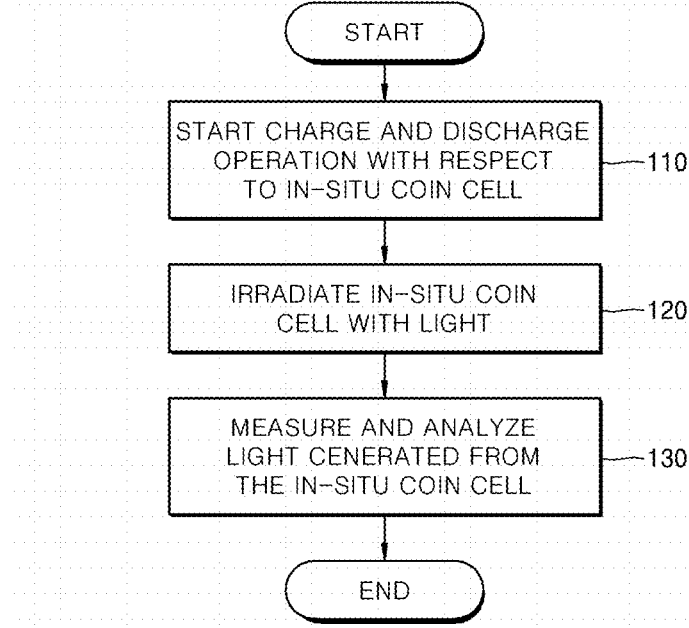
FIG. 6 is a flow chart of a method of measuring the state change of an electrode of an in-situ coin cell for real time analysis according to an exemplary embodiment.

An exemplary embodiment of a measuring method using the in-situ coin cell C1 will be described with reference to FIG. 6. In FIG. 6, an exemplary embodiment of a measuring method of the first measuring system AS1 of FIG. 4 will be referred.

Referring to FIG. 6, a charge and discharge operation with respect to the in-situ coin cell C1 is performed (110). The charge and discharge operation with respect to the in-situ coin cell C1 may be performed using a potentiostat connected to the first and second electrode structures 38 and 34. While performing the charge and discharge operation, light is irradiated to the first electrode structure 38 of the in-situ coin cell C1 using the optical measuring system 60 (120). Afterwards, light emitted from the first electrode structure 38 is measured and analyzed (130). In the operation 130 that measures and analyzes the emitted light, when the light irradiated to the first electrode structure 38 is non-coherent light like white light, an optical image of the first electrode structure 38 may be measured using a camera included in the measuring unit (device) 60D. When the light irradiated to the first electrode structure 38 is a laser beam, a Raman shift or a PL characteristic may be measured by using a spectrometer included in the measuring unit (device) 60D.

FIGS. 7 through 10 show results measured in the measuring method described above.

Figure 7:
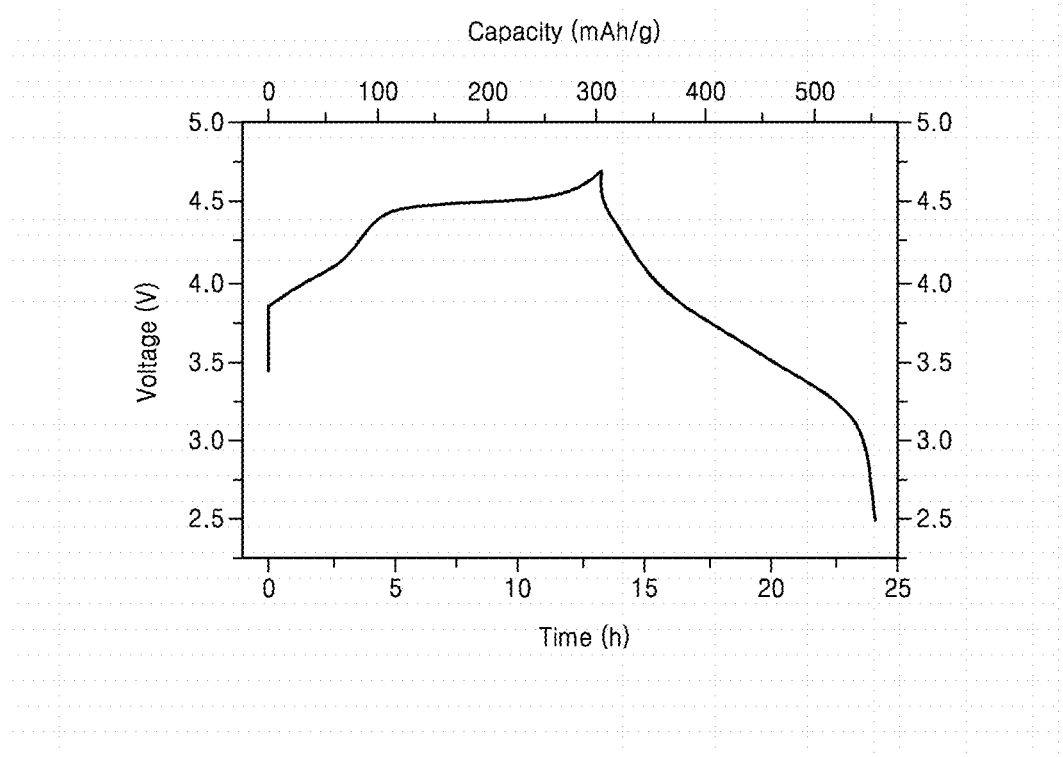
FIG. 7 is a graph showing a voltage-capacity change of an in-situ coin cell for real time analysis during charging and discharging.

FIG. 7 is a graph showing a characteristic of voltage-capacity change of an in-situ coin cell for real time analysis during charging and discharging.

Referring to FIG. 7, the voltage and capacity are increased together when charging, and the voltage and the capacity are reduced together when discharging.

Figure 8:
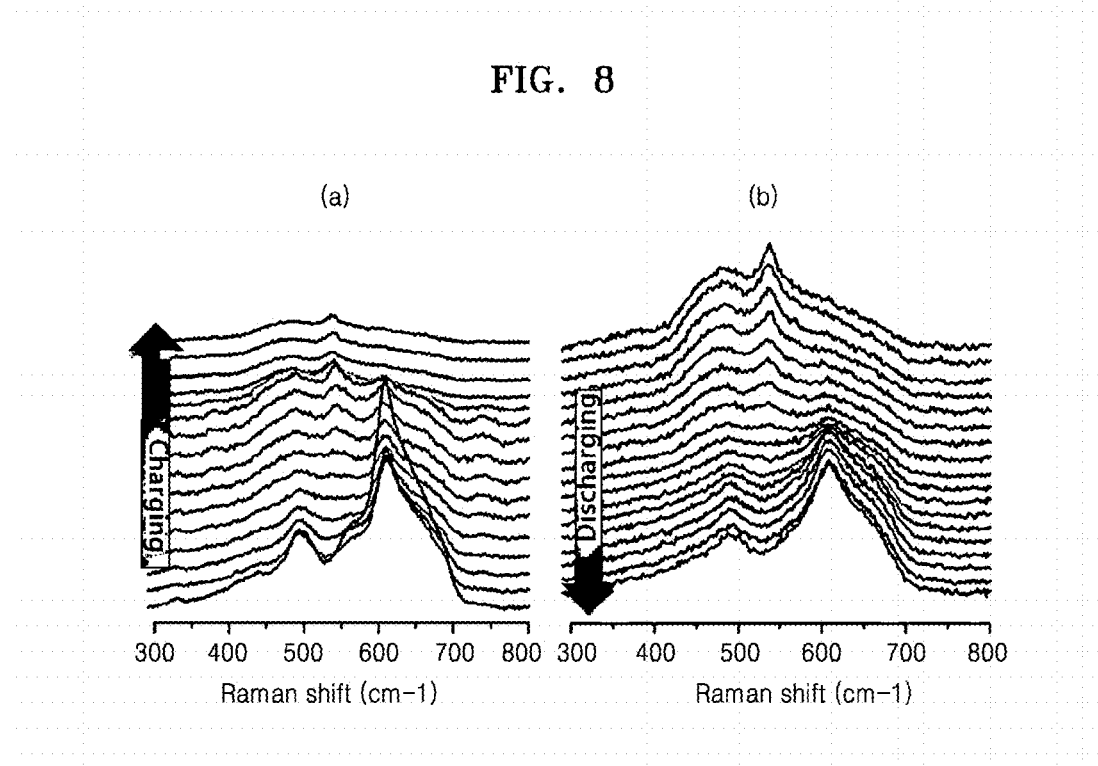
FIG. 8 is a graph showing Raman shifts according to charge and discharge of an in-situ coin cell for real time analysis, according to an exemplary embodiment.

FIG. 8 is a graph showing Raman shifts obtained in real time with respect to the first electrode structure 38 during charging (a) and discharging (b) an in-situ coin cell for real time analysis, according to an exemplary embodiment. In such an embodiment, an OLO cathode is used as the first electrode structure 38 and an aluminum foil is used as the first metal foil 40 which is a current collector, to obtain the result of FIG. 8.

Referring to FIG. 8, Raman active modes observed at initial stages of Eg (500 cm$^{-1}$) and A1g (600 cm$^{-1}$) gradually disappear during a charge process in which Li separation occurs and then a new Raman peak appears at 544 cm$^{-1}$. It is known that this phenomenon occurs due to the change of oxygen number of Ni that presents in Mn-rich layered oxide cathode by the progress of Li separation. When the charge process is completed, most of Raman peaks generated by Eg and A1g are disappeared. In this manner, through measuring Raman shifts using the in-situ coin cell C1, information with respect to structure change or chemical environment change of an active material of the first electrode structure 38 during charge and discharge operation may be obtained in real time.

Figure 9:
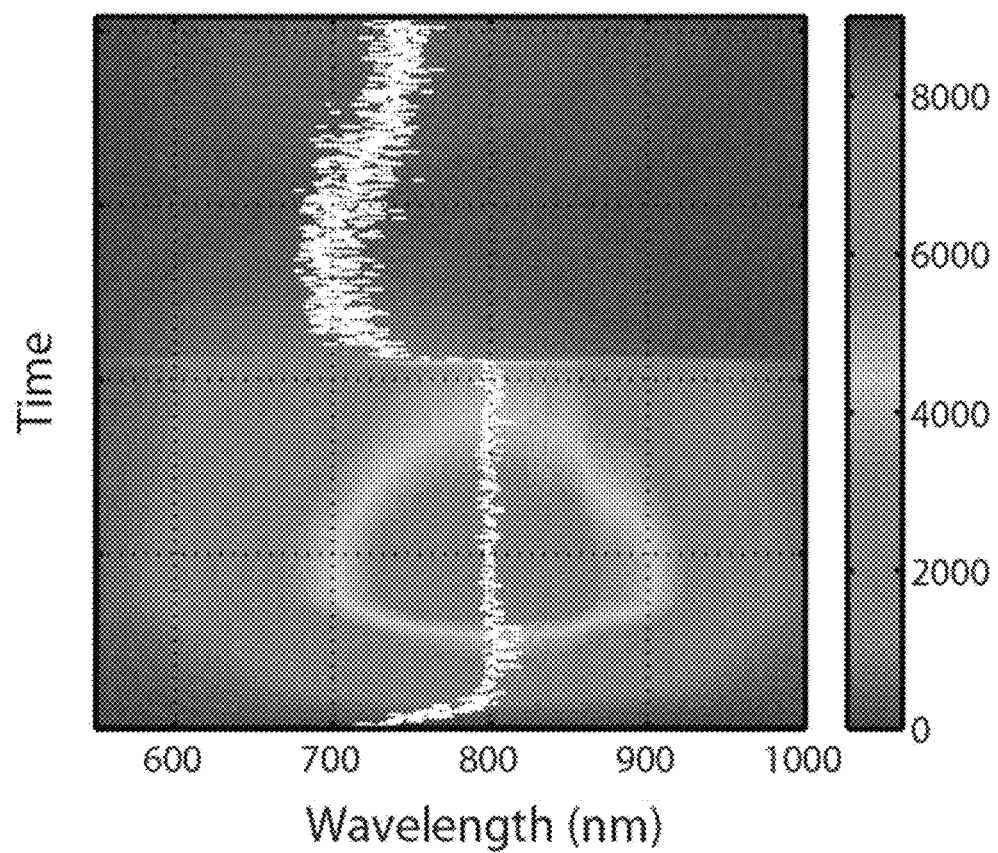
FIG. 9 is a photograph showing a result of photoluminescence ("PL") characteristic measurement during charge and discharge of an in-situ coin cell for real time analysis, according to an exemplary embodiment.

FIG. 9 is a photograph showing a result of PL characteristic measurement with respect to the first electrode structure 38 during charge and discharge of an in-situ coin cell for real time analysis, according to an exemplary embodiment. The condition of the in-situ coin cell to obtain the result shown in FIG. 9 may be equal to the condition for obtaining the result of FIG. 8.

Referring to FIG. 9, it is observed that the intensity of the initial PL spectrum rapidly increases and also the location of peak that generates PL is moved as the charge process is preceded. When the charge process is completed, the intensity and location of the PL return to a state similar to the initial state. The PL measured from the first electrode structure 38 may vary according to the structure change of the active material of the first electrode structure 38 and the change of oxidation state of a transition metal of the first electrode structure 38. Therefore, information of the structure change of the active material of the first electrode structure 38 and the change of oxidation state of a transition metal of the first electrode structure 38 may be obtained by measuring the change of PL by using the in-situ coin cell C1 described above.

Figure 10:
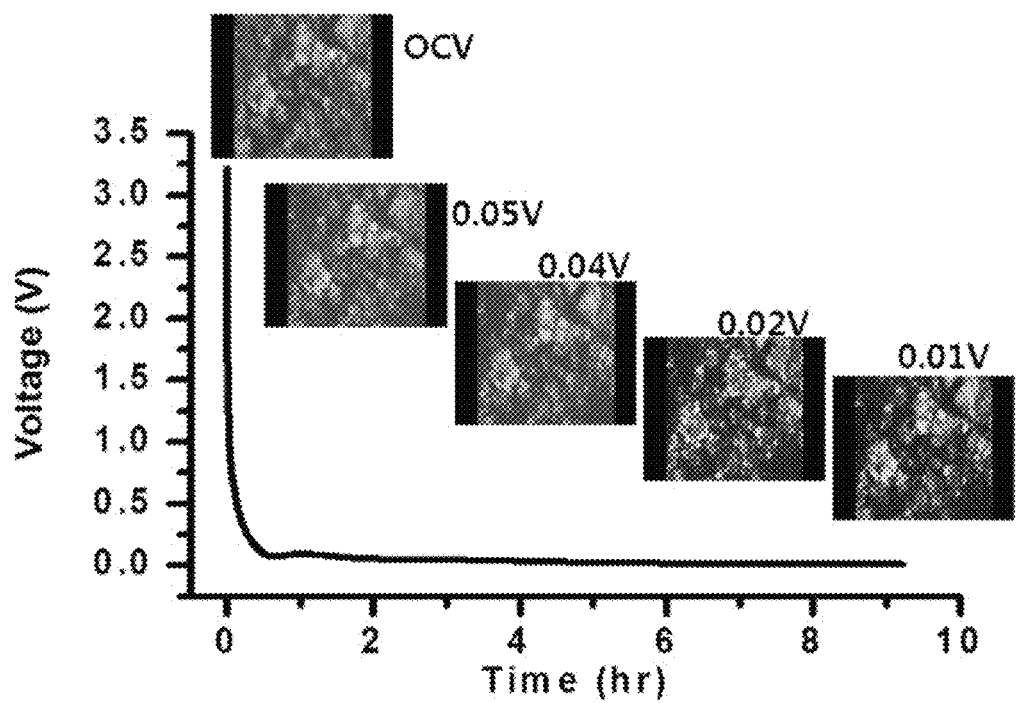
FIG. 10 shows optical images for showing the change of a graphite anode during charging and discharging of an in-situ coin cell for real time analysis, according to an exemplary embodiment.

FIG. 10 shows optical images of the first electrode structure 38 measured in real time during charging and discharging of an in-situ coin cell for real time analysis, according to an exemplary embodiment. FIG. 10 shows the results obtained when the first electrode structure 38 is a graphite anode and light irradiated to the first electrode structure 38 is white light. The optical images of FIG. 10 are obtained by taking light reflected from the first electrode structure 38 using a CCD camera.

Referring to FIG. 10, although the relative color difference is not clearly distinguished because the images are in black and white, in the images taken at each voltage during a charge and discharge operation, the color of graphite anode is gradually brighter from left to right. The color change of the graphite anode during the charge and discharge operation is related to lithiation of the graphite anode. Accordingly, information with respect to the degree of lithiation of the first electrode structure 38 may be obtained by irradiating the first electrode structure 38 with white light and measuring the color change of the first electrode structure 38 in real time during charge and discharge operation.

The first graph G1 of FIG. 10 is a lithiation curve obtained during the lithiation process of the graphite anode when the first electrode structure 38 is the graphite anode.

Next, an exemplary embodiment of a method of manufacturing the in-situ coin cell C1 will be described with reference to FIGS. 11 through 20. Like reference numerals are used to indicate elements that are described above, and any repetitive detailed descriptions thereof will be omitted.

Figure 11:
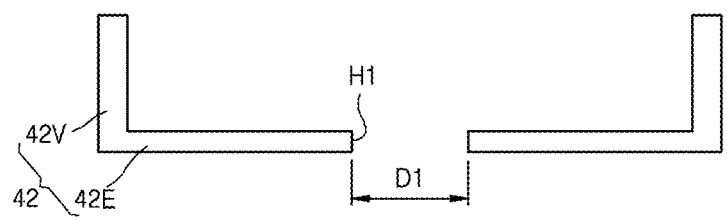
FIGS. 11 through 20 are cross-sectional views and plan views illustrating a method of manufacturing an in-situ coin cell for real time analysis, according to an exemplary embodiment.

Referring to FIG. 11, the case 42 for in-situ coin cell including the horizontal portion 42E and the vertical portion 42V is prepared. The first through hole H1 is defined or formed in the horizontal portion 42E of the case 42. Light is irradiated through the first through hole H1. A diameter D1 of the first through hole H1 may be appropriately controlled. In one exemplary embodiment, the diameter D1 of the first through hole H1 may be about 5 mm or less, for example, in a range from about 1 mm to about 2 mm.

Figure 12:
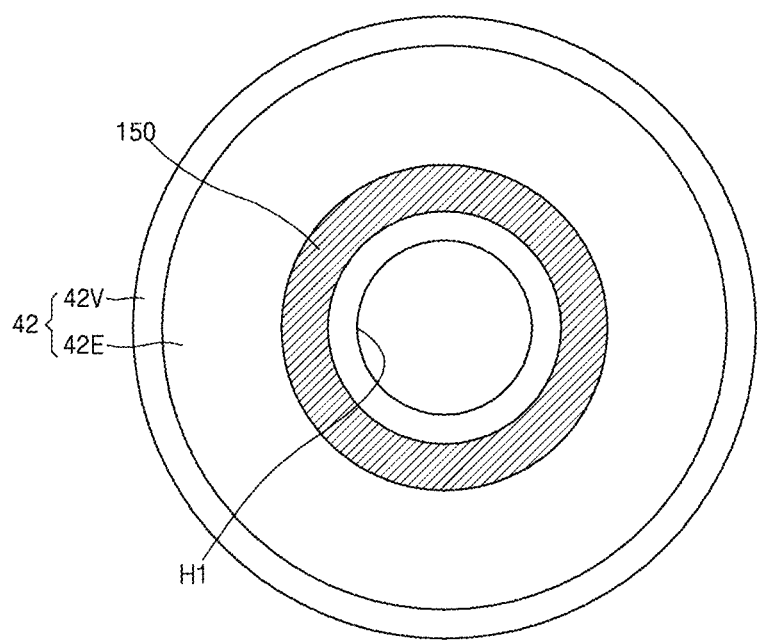

FIG. 12 is a plan view of the case 42 of FIG. 11.

Referring to FIG. 12, the first through hole H1 is defined or formed in the horizontal portion 42E of the case 42. As described above with reference to FIG. 2, an adhesive 150 may be applied to the horizontal portion 42E around the first through hole H1. The adhesive 150 may be a sealing adhesive.

Figure 13:
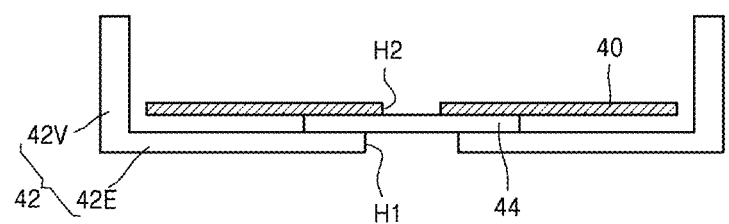

Next, as depicted in FIG. 13, the first transparent window 44 covering the whole first through hole H1 is attached to the horizontal portion 42E of the case 42 where the adhesive 150 is applied. Next, the first metal foil 40, which is a current collector, is provided or disposed on the first transparent window 44. The second through hole H2 may be defined or formed in the first metal foil 40 before disposing the first metal foil 40 on the first transparent window 44. The first metal foil 40 may be disposed in a way such that the center of the second through hole H2 is matched to the center of the first through hole H1.

Figure 14:
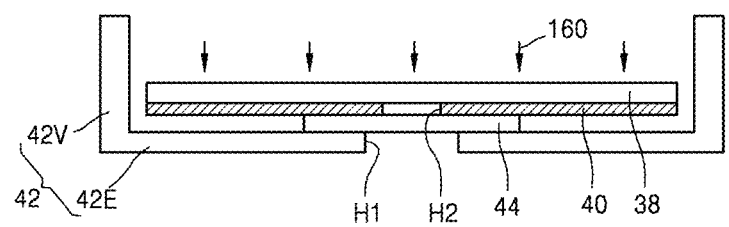

Next, as depicted in FIG. 14, the first electrode structure 38 is mounted on the first metal foil 40. The first electrode structure 38 and the first metal foil 40 may directly contact each other. In an exemplary embodiment, the first electrode structure 38 and the first metal foil 40 may be separately stacked and then patterned to a circular shape, and may be mounted on the first transparent window 44 as the stacked state. After mounting the first electrode structure 38 on the first metal foil 40, an electrolyte 160 is supplied to the first electrode structure 38. In an exemplary embodiment, the electrolyte 160 may be supplied to the first electrode structure 38 by a drop method. In such an embodiment, electrolyte drops are dropped on the first electrode structure 38. The electrolyte 160 may be supplied to the first electrode structure 38 until the first electrode structure 38 sufficiently gets wet.

Figure 15:
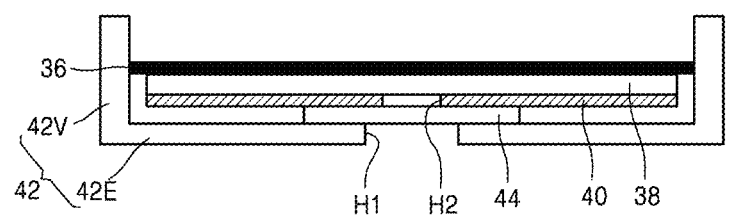

Next, as depicted in FIG. 15, the separator 36 is provided or placed on the first electrode structure 38. The separator 36 covers a whole upper surface of the first electrode structure 38. The separator 36 may contact an inner surface of the vertical portion 42V of the case 42. The separator 36 may directly contact the first electrode structure 38.

Figure 16:
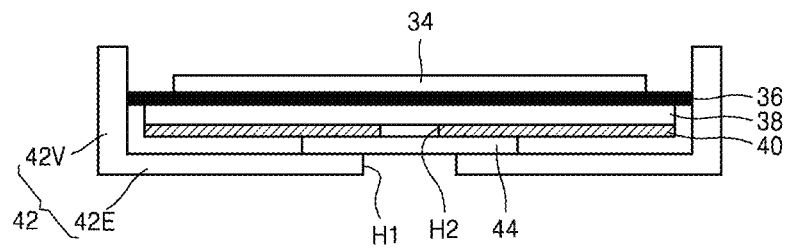
Figure 17:
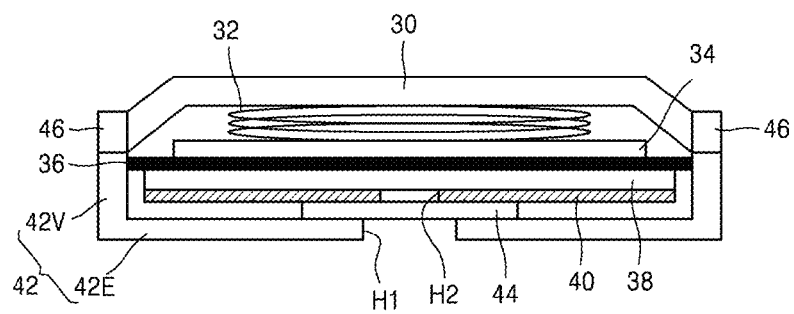

Next, as depicted in FIG. 16, the second electrode structure 34 is provided or mounted on the separator 36. As depicted in FIG. 17, the elastic body 32 is provided or placed on the second electrode structure 34. The cap 30, which covers the elastic body 32, the second electrode structure 34 and the separator 36, is combined to the case 42. The case 42 and the cap 30 may be combined using the gasket 46 as intermediation. By the gasket 46, the case 42 and the cap 30 may be sealed. As a result, the in-situ coin cell C1 of FIG. 1 is formed.

In an alternative exemplary embodiment of the manufacturing process described above, a through hole may be defined or formed in the cap 30 instead of forming the first through hole H1 in the case 42. In such an embodiment, the through hole is defined or formed in the cap 30 before combining the cap 30 to the case 42. An in-situ coin cell formed in such a manner defines correspond to the in-situ coin cell C2 of FIG. 2.

In an alternative exemplary embodiment, through holes may be defined or formed in both the case 42 and the cap 30. Such an embodiment will be described with reference to FIGS. 18 through 20. Elements that are different from the elements described above will be described in detail.

The same structure as described above is formed as shown in FIG. 11 to FIG. 14.

Figure 18:
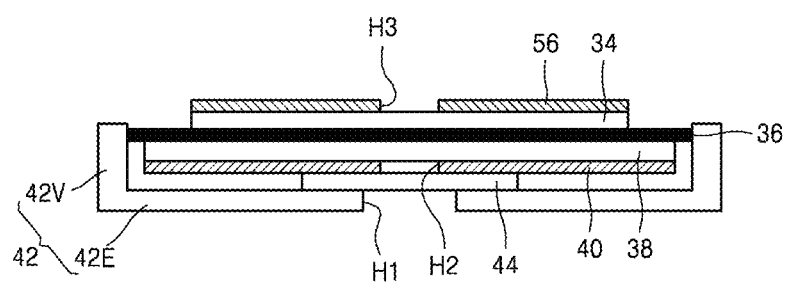

Next, as depicted in FIG. 18, the second electrode structure 34 and the second metal foil 56 are sequentially provided or mounted on the separator 36. The third through hole H3 is defined or formed in the second metal foil 56. A portion of the second electrode structure 34 is exposed through the third through hole H3. The third through hole H3 may be formed before mounting the second metal foil 56. The second metal foil 56 may be disposed in a way such that the third through hole H3 is disposed directly above the second through hole H2 of the first metal foil 40.

Figure 19:
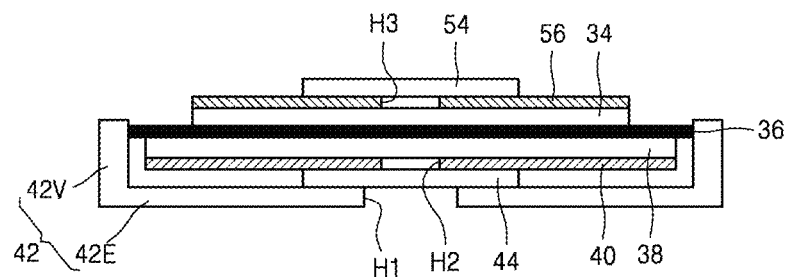

Next, as depicted in FIG. 19, the second transparent window 54 that covers the third through hole H3 is provided or formed on the second metal foil 56. The second transparent window 54 may cover whole of the third through hole H3.

Figure 20:
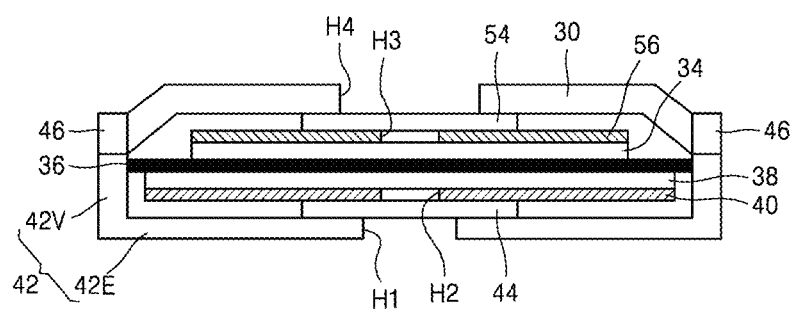

Next, as depicted in FIG. 20, the second transparent window 54 and the elements below the second transparent window 54 are covered with the cap 30 in which the fourth through hole H4 is defined or formed. The cap 30 is in contact with the second transparent window 54. The cap 30 and the second transparent window 54 are sealed. In one exemplary embodiment, for example, the cap 30 and the second transparent window 54 may be bonded by using an adhesive. A portion of the second transparent window 54 is exposed through the fourth through hole H4. The entire of the fourth through hole H4 may be covered by the second transparent window 54. The cap 30 may be disposed in a way such that whole of the third through hole H3 is located within the fourth through hole H4. In such an embodiment, the cap 30 may be mounted in a way such that the center of the fourth through hole H4 is matched to the center of the third through hole H3. The cap 30 and the case 42 may be combined to each other using the gasket 46 as intermediation.

Figure 21A:
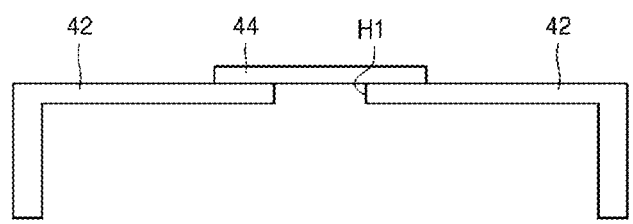
FIGS. 21A and 21B are cross-sectional views showing mounting a transparent window in alternative exemplary embodiments of the method of manufacturing the in-situ coin cell.
Figure 21B:
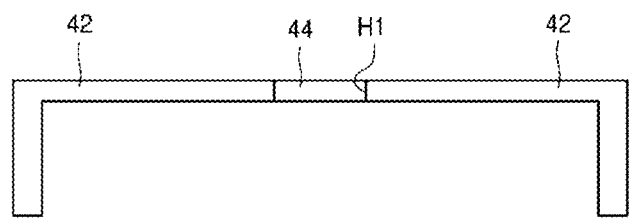

In an alternative exemplary embodiment, the first transparent window 44 may be provided or formed in a different type. In one alternative exemplary embodiment, for example, as depicted in FIG. 21A, the first transparent window 44 may be mounted on an external surface of the case 42 to cover the first through hole H1, or alternatively, as depicted in FIG. 21B, the first transparent window 44 may be completely inserted into the fourth through hole H4. In such embodiments, a sealing material, for example, an epoxy may be used to seal between the first transparent window 44 and the case 42. In an exemplary embodiment, the second transparent window 54 may be modified similarly to the first transparent window 44 shown in FIGS. 21A and 21B.

The electrode structure (cathode/anode), pressure, electrolyte, and amount of the electrolyte of the in-situ coin cells for real time analysis described above, according to exemplary embodiments may be the same as an in-situ coin cell that is widely used. Accordingly, analyzed results obtained from the in-situ coin cells for real time analysis, according to exemplary embodiments may be highly reliable enough to be applied to an actually used in-situ coin cell. Also, the in-situ coin cell for real time analysis described above may be simply manufactured by making holes in a coin cell case and a current collector (a metal foil), and thus, the manufacturing method is substantially simple when compared to that of the related art.

Also, after charging and discharging, light is irradiated to electrode structures (cathode and/or anode) and the state change of the electrodes according to the charge and discharge may be analyzed by measuring scattered light, reflected light, and/or light emitted from the electrode structures. Accordingly, various measuring and analyzing methods that use scattered light, reflection light, and/or emitted light may be together used for the in-situ coin cells according to the exemplary embodiments. Accordingly, the in-situ coin cells according to the exemplary embodiments have generality in measuring and analyzing methods.

While one or more exemplary embodiments of the invention have been described with reference to the figures, it will be understood by those of ordinary skill in the art that various changes in form and details may be made therein without departing from the spirit and scope as defined by the following claims.

What is claimed is:

1. An in-situ coin cell comprising:
a case;
a cap coupled to the case; and
an energy storage member disposed between the case and the cap,
wherein
a through hole is defined in at least one of the case and the cap,
the energy storage member comprises a current collector adjacent to the through hole, and
another through hole is defined in the current collector.

2. The in-situ coin cell of claim 1, further comprising:
a transparent window between the current collector and at least one of the through hole and the another through hole.

3. The in-situ coin cell of claim 1, wherein the energy storage member comprises:
a first current collector;
a first electrode structure in contact with the first current collector;
a second electrode structure facing the first electrode structure;
a separator disposed between the first and second electrode structures; and
an electrolyte,
wherein
a first through hole is defined in the first current collector, and
a portion of the first electrode structure is exposed through the first through hole.

4. The in-situ coin cell of claim 3, the energy storage member further comprises:
a second current collector in contact with the second electrode structure,
wherein
a second through hole is defined in the second current collector, and
a portion of the second electrode structure is exposed through the second through hole.

5. The in-situ coin cell of claim 3, wherein
one of the first and second electrode structures is a cathode, and
the other of the first and second electrode structures is an anode.

6. The in-situ coin cell of claim 1, further comprising:
an elastic body between the energy storage member and one of the case and the cap.

7. A measuring system comprising:
the in-situ coin cell of claim 1; and
a first optical measuring system which irradiates the in-situ coin cell with light and measures light emitted from the in-situ coin cell due to the irradiation.

8. The measuring system of claim 7, wherein the first optical measuring system comprises:
a light source;
a light path conversion element which transmits light received from the light source to the in-situ coin cell and passes light received from the in-situ coin cell;
a lens system which focuses light received from the light path conversion element onto the in-situ coin cell and transmits light received from the in-situ coin cell to the light path conversion element; and
a measuring device which measures pieces of optical information, which are generated by the in-situ coin cell and different from each other.

9. The measuring system of claim 8, wherein the light source comprises a light source which emits coherent light.

10. The measuring system of claim 9, wherein
the light source comprises a plurality of light sources, and
the plurality of light sources emits coherent lights having different wavelengths from each other.

11. The measuring system of claim 8, wherein the light source comprises a light source which emits non-coherent light.

12. The measuring system of claim 8, wherein
the measuring device comprises a plurality of measuring devices, and
the plurality of measuring devices measures the pieces of optical information, which are generated by the in-situ coin cell and different from each other.

13. The measuring system of claim 12, wherein the plurality of measuring devices comprises an optical image measuring camera, a Raman shift measuring spectrometer, and a photoluminescence measuring spectrometer.

14. The measuring system of claim 7, further comprising:
a second optical measuring system opposite to the first optical measuring system with the in-situ coin cell therebetween.

15. A method of measuring a state change of an electrode of the in-situ coin cell of claim 1, the method comprising:
starting an operation of charging and discharging the in-situ coin cell;
irradiating the in-situ coin cell with light; and
measuring light from the in-situ coin cell as a result of the irradiating.

16. The method of claim 15, wherein the irradiating the light comprises irradiating coherent light or non-coherent light.

17. A method of manufacturing an in-situ coin cell, the method comprising:
preparing a case;
providing an energy storage member on a horizontal portion of the case, wherein the energy storage member comprises a current collector in which a through hole is defined; and
providing a cap which covers the energy storage member and is coupled to the case, and
forming a through hole in at least one of the case and the cap.

18. The method of claim 17, wherein the through hole is formed in the horizontal portion of the case.

19. The method of claim 17, wherein the through hole is formed in the cap.

20. The method of claim 17, wherein the forming the through hole in at least one of the case and the cap comprises forming the through hole both in the horizontal portion of the case and the cap.

21. The method of claim 17, wherein the providing the energy storage member comprises:
disposing a first current collector, in which a through hole is defined, and a first electrode structure to contact the first current collector;
disposing a second electrode structure opposite to the first electrode structure;
disposing a separator between the first electrode structure and the second electrode structure; and
supplying an electrolyte to the first electrode structure.

22. The method of claim 21, wherein the providing the energy storage member further comprises disposing a second current collector, in which a through hole is defined, on the second electrode structure.

23. The method of claim 17, further comprising:
disposing a transparent window between the case and the current collector,
wherein the through hole is formed in the case, and
the case is adjacent to the current collector.

24. The method of claim 17, further comprising:
disposing a transparent window between the cap and the current collector,
wherein the through hole is formed in the cap, and
the cap is adjacent to the current collector.

25. The method of claim 17, further comprising:
disposing an elastic body between one of the cap and the case, in which the through hole is not formed, and the energy storage member.

* * * * *